(12) United States Patent
Voo

(10) Patent No.: US 7,248,028 B1
(45) Date of Patent: Jul. 24, 2007

(54) LOW-POWER CHARGE PUMP REGULATOR

(75) Inventor: Thart Fah Voo, Singapore (SG)

(73) Assignee: Marvell International Ltd. (BM)

( * ) Notice: Subject to any disclaimer, the term of this patent is extended or adjusted under 35 U.S.C. 154(b) by 0 days.

(21) Appl. No.: 11/191,467

(22) Filed: Jul. 27, 2005

Related U.S. Application Data

(60) Provisional application No. 60/654,637, filed on Feb. 17, 2005.

(51) Int. Cl.
*G05F 1/00* (2006.01)

(52) U.S. Cl. .......................... 323/282; 363/49; 363/59; 327/537

(58) Field of Classification Search ............ 363/16–20, 363/56, 59, 60; 323/222, 285, 901, 282; 327/536–543
See application file for complete search history.

(56) References Cited

U.S. PATENT DOCUMENTS

| 4,716,510 | A  | * | 12/1987 | Pace et al. ..................... 363/49 |
| 6,320,796 | B1 |   | 11/2001 | Voo et al. |
| 6,404,290 | B1 |   | 6/2002  | Voo |
| 6,566,847 | B1 | * | 5/2003  | Chou et al. .................. 323/282 |

* cited by examiner

*Primary Examiner*—Rajnikant B. Patel

(57) ABSTRACT

A low-power charge pump regulator is provided. The low-power charge pump regulator may periodically turn off charge pumping portions of the charge pump circuitry to reduce power consumption. The charge pumping portions of the charge pump circuitry may then be turned on when they are needed to maintain the output of the charge pump regulator. In some embodiments, where the leakage off the voltage regulator output is small, the charge pumping portions of the charge pump circuitry may only need to be turned on for brief periods of time.

20 Claims, 3 Drawing Sheets

LOW-POWER CHARGE PUMP REGULATOR

This application claims the benefit of provisional application 60/654,637 filed Feb. 17, 2005, which is hereby incorporated by reference herein in its entirety.

BACKGROUND OF THE INVENTION

This invention relates to a low-power charge pump regulator.

A charge pump regulator may be used to provide a regulated voltage output that has a higher or lower voltage than the power supply voltage. Leakage currents within the charge pump regulator generally require the voltage of the charge pump to be constantly recharged (i.e., pumped) to maintain the regulated voltage output.

In some circuits, the charge pump regulator may not need to pump continuously in order to maintain the voltage level of the regulator output (i.e., the rate at which the voltage level leaks may be slow enough to permit some period of leakage before the voltage level is recharged). In these circuits, it would be desirable to reduce power consumption by not operating the charge pump continuously.

In view of the forgoing, it would be desirable to provide a low-power charge pump regulator.

SUMMARY OF THE INVENTION

These and other objects of the invention are provided by a low-power charge pump regulator.

The low-power charge pump regulator may periodically inactivate or turn off charge pumping portions of the charge pump circuitry to reduce power consumption. The charge pumping portions of the charge pump circuitry may be activated or turned on when needed to maintain the output voltage of the charge pump regulator. In some embodiments, where the leakage off the voltage regulator output is small, the charge pumping portions of the charge pump circuitry may only need to be turned on for short periods of time.

Further features of the invention, its nature and various advantages, will be more apparent from the accompanying drawings and the following detailed description of the preferred embodiments.

DETAILED DESCRIPTION

Figure 1:
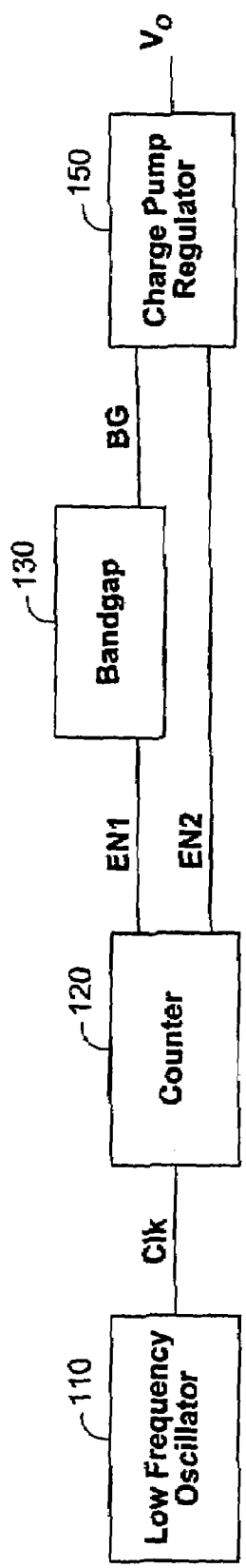
FIG. 1 shows a simplified diagram of a low-power charge pump regulator circuit in accordance with some aspects of the present invention.
Figure 2:
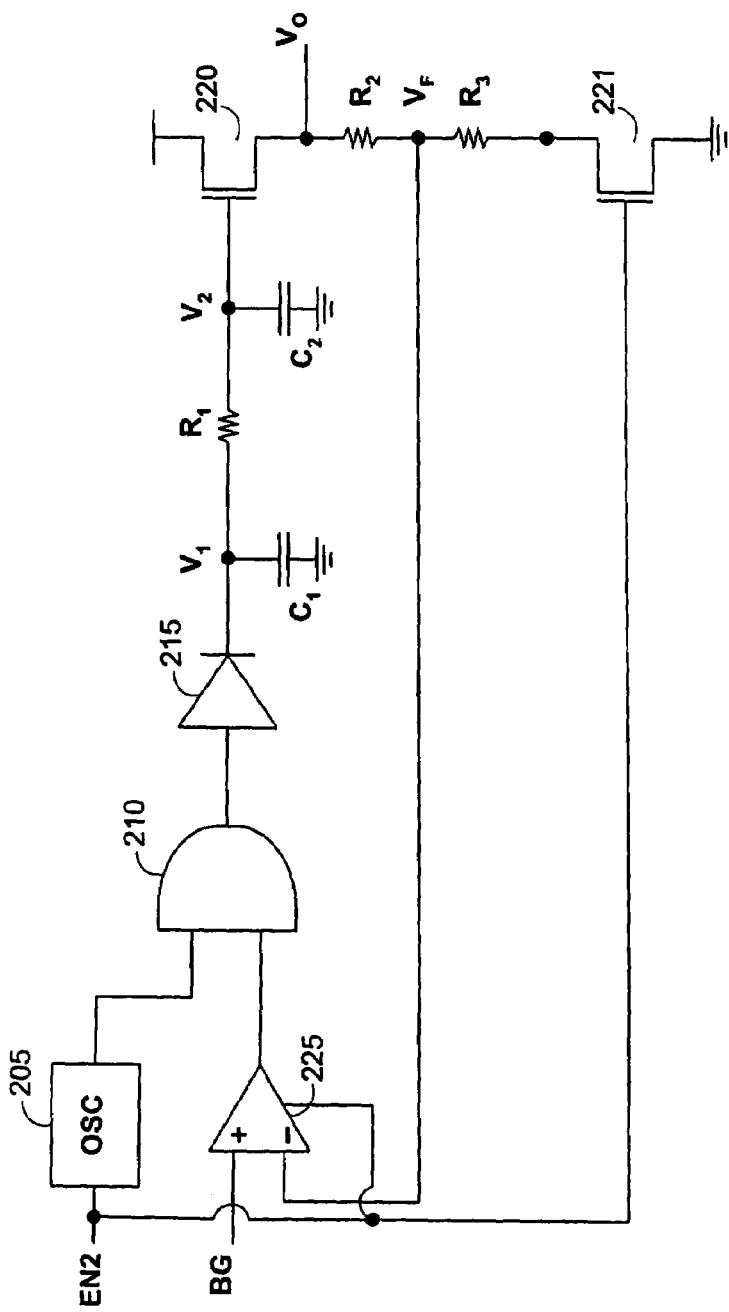
FIG. 2 shows a more detailed diagram of the charge pump regulator.

FIG. 1 shows low-power charge pump regulator circuit 100 in accordance with some aspects of the present invention. Low-power charge pump regulator circuit 100 contains low-frequency oscillator 110, counter 120, bandgap reference 130, and charge pump regulator 150. The operation of low-power charge pump regulator may be explained with reference to the operation of charge pump regulator 150 shown in more detail in FIG. 2.

Charge pump regulator 150 contains high-frequency oscillator 205, AND gate 210, diode 215, capacitors $C_1$ and $C_2$, resistors $R_1$, $R_2$, and $R_3$, transistors 220 and 221, and amplifier 225. While charge pump regulator 150 is active, high-frequency oscillator outputs a high-frequency output signal which is connected to one of the inputs of AND gate 210. For example, the high-frequency signal may have a frequency ranging from one megahertz to a few hundred megahertz. The second input of AND gate 210 is connected to the output of amplifier 225. Amplifier 225 is connected to bandgap reference voltage BG from bandgap reference 130 (FIG. 1) and feedback voltage $V_F$. Alternatively, bandgap reference voltage BG may be substituted for any suitable voltage reference. Feedback voltage $V_F$ is related to output voltage $V_O$ by the voltage divider formed by resistors $R_2$ and $R_3$. While output voltage $V_O$ is high and feedback voltage $V_F$ is larger than bandgap reference voltage BG, amplifier 225 outputs a low signal which keeps the output of AND gate 210 from going high. In this state charge pump regulator 150 is not pumping. However, when output voltage $V_O$ drops and causes feedback voltage $V_F$ to drop below bandgap voltage BG, amplifier 225 outputs a high voltage signal. When amplifier 225 outputs a high voltage signal, the output of AND gate 210 tracks high-frequency oscillator 205. Thus each time the high-frequency signal is high, current flows from AND gate 210 through diode 215 to charge capacitor $C_1$, resistor $R_1$, and capacitor $C_2$. Resistor $R_1$ and capacitor $C_2$ may smooth-out the pulses from the high-frequency signal to produce voltage $V_2$. Alternatively, capacitors $C_1$ and $C_2$ and resistor $R_1$ may be replaced with a single capacitor to store charge for voltage $V_2$. Voltage $V_2$ powers the gate of transistor 220 which in turn powers output voltage $V_O$. In this state, charge pump regulator 150 is pumping. When output voltage $V_O$ is charged, the output of amplifier 225 is switched low and AND gate 210 stops charging voltage $V_2$ (i.e., charge pump regulator 150 stops pumping). Leakage currents slowly drain the charge from capacitors $C_1$ and $C_2$ and reduces voltage $V_2$ until the voltage level of output voltage $V_O$ drops and charge pump regulator 150 begins pumping again.

Traditionally, while a charge pump cycles between pumping and not pumping, the circuitry of charge pump regulator remains active and powered up. However, in accordance with the present invention, power consumption of charge pump regulator 150 may be reduced by inactivating or turning off the charge pumping portions of charge pump regulator 150 while the charge pump is not pumping. The charge pumping portions of charge pump regulator 150 may include, high-frequency oscillator 205 and amplifier 225. Power consumption may further be reduced by turning off bandgap reference circuit 130 (FIG. 1). Even while the charge pumping portions of charge pump regulator 150 are inactive or turned off, charge pump regulator may still provide output voltage $V_O$. The charge pumping portions of charge pump regulator 150 may then be activated or turned back on with sufficient time before the charge pump begin pumping again or at least before the output voltage $V_O$ drops below an unacceptable level. According to the present embodiment, the charge pumping portions of charge pump regulator may be inactivated by control signal EN2. When control signal EN2 is brought low, high-frequency oscillator 205 and amplifier 225 are turned off. Transistor 221 may also be turned off to maintain the voltage level of output voltage $V_O$.

In charge pump regulator 150, voltage $V_2$ powers the gate of transistor 220 and does not directly power output voltage $V_O$. Therefore, some charge may leak off capacitor $C_2$ and reduce the voltage level of $V_2$ before output voltage $V_O$ is affected. Because it may take more time for output voltage $V_O$ to discharge than to recharge, charge pump regulator may only need to pump for a small portion of the time. Accordingly, the charge pumping portions of charge pump regulator may be turned off to reduce power consumption while the charge pump is not pumping. Similarly, in any design where the charge pump is not pumping for an extended period of time, power consumption may be reduced by turning of charge pumping portions of the charge pump. An extended period of time may be determined to be an amount of time sufficient to turn off and turn on the charge pumping portions. The time to turn on the charge pumping portions may further include time for the charge pumping portions to stabilized after they are turned on.

Low-power charge pump regulator circuit 100 is one embodiment of a charge pump regulator circuit that may turn off and on charge pumping portions in order to reduce power consumption in accordance with some aspects of the present invention. Low-frequency oscillator 110 outputs a low-frequency clock signal CLK. Clock signal CLK may then be used by counter 120 to provide enabling signals EN1 and EN2. Enabling signal EN1 may turn on bandgap reference 130 to provide bandgap voltage reference signal BG. Enabling signal EN2 may turn on charge pumping portions of charge pump regulator 150.

Figure 3:
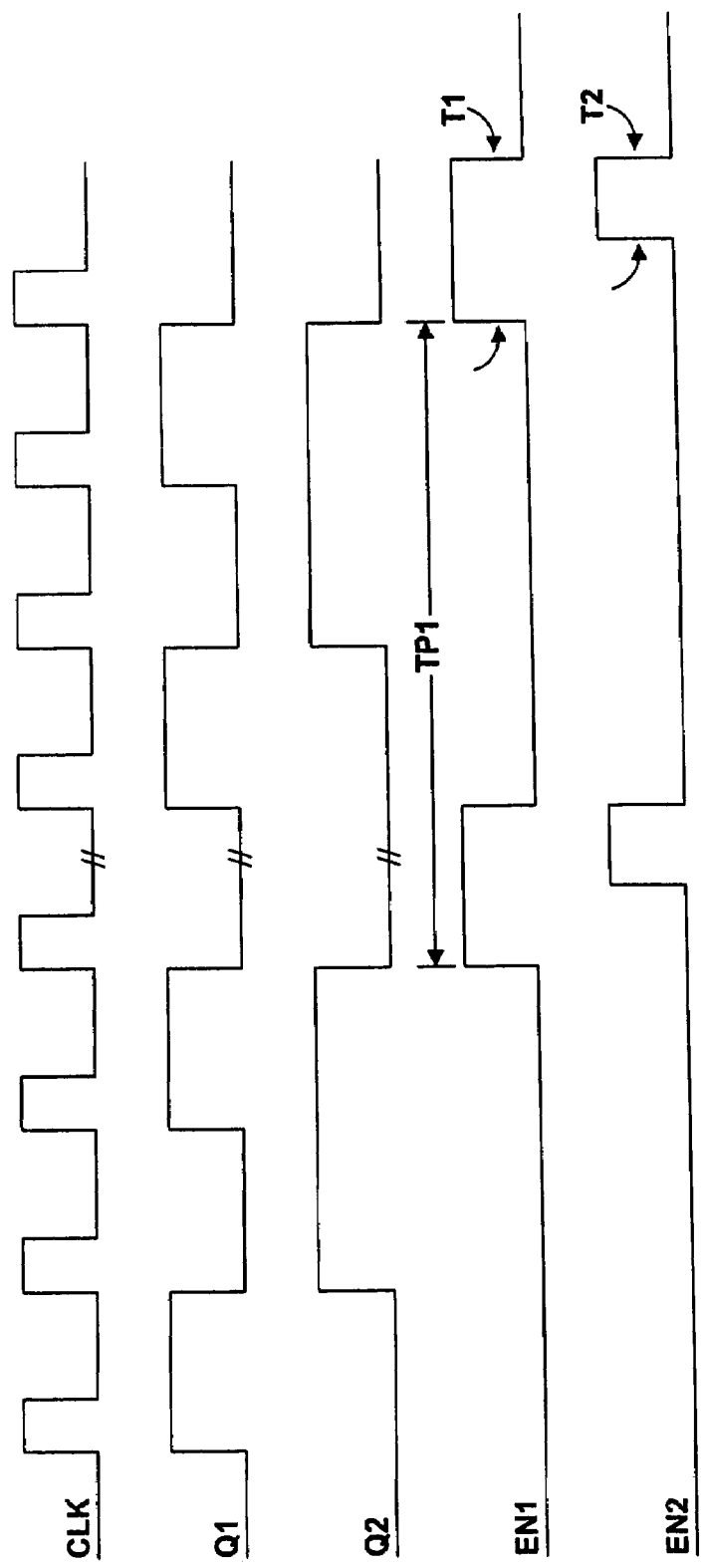
FIG. 3 shows a simplified diagram of illustrative control signals used to control the low-power charge pump regulator circuit in accordance with some aspects of the present invention.

FIG. 3 shows a simplified diagram of illustrative control signals that may be used to control low-power charge pump regulator circuit in accordance with some aspects of the present invention. CLK is the low-frequency clock signal produced by low-frequency oscillator 110. For example, low-frequency clock signal may have a period of approximately 100 microseconds. Based on low-frequency clock signal CLK, counter 120 may produce internal clock signals Q1 and Q2 which may in turn be used to produce counter outputs EN1 and EN2. For example, clock signals Q1 may have a period of 200 microseconds and Q2 may have a period of 400 microseconds. Signal EN1 may be enabled for 100 microseconds (T1) and signal EN2 may be enabled for 50 microseconds (T2) out of each 400 microsecond period (TP1). Signal EN1 turns on bandgap reference 130 and signal EN2 turns on the charge pumping portions of charge pump regulator 150. Signal EN1 may be asserted before signal EN2 in order to turn on bandgap reference 130 and to provide a valid reference voltage to charge pump regulator 150. After bandgap reference 130 is turned on and provides a valid reference voltage output, charge pump regulator 150 may be enabled by signal EN2. Both bandgap reference 130 and charge pump regulator 150 may remain on for sufficient time to allow the output voltage $V_O$ of charge pump regulator to be charged and for charge pump regulator to stop pumping. According to this illustrative embodiment, power consumption may be reduced by operating bandgap reference 130 for only a quarter of the time and by operating charge pump regulator 150 for only an eighth of the time. It should be understood that this clocking scheme of counter 120 is merely illustrative and that any number of other clocking schemes may be using in accordance with the present invention.

Thus it is seen that a low-power charge pump regulator has been provided. It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. Low-power charge pump regulator, comprising:
a clock signal;
a charge pump regulator circuit comprising a charge pumping circuit and an output circuit;
a control circuit operative to activate and inactivate the charge pumping circuit in response to the clock signal; and
charge pump regulator circuit comprises:
an oscillator circuit operative to provide an oscillating signal;
an AND gate operative to receive a first input signal comprising the oscillating signal and a second input signal;
a diode operative to receive an output from the AND gate;
a charge storage circuit operative to receive an output from the diode and to store charge received from the diode output;
a transistor comprising a control input coupled to the charge storage circuit, a first terminal coupled to a supply voltage, and a second terminal operative to supply an output voltage;
a first and a second resistor connected in series coupled to the second terminal of the transistor; and
an amplifier having a first input operative to receive a reference voltage signal, a second input coupled between the first and the second resistors, and an output coupled to the second input of the AND gate.

2. The low-power charge pump regulator of claim 1 wherein the charge pumping circuit is activated a period of time before the charge pumping circuit begins pumping.

3. The low-power charge pump regulator of claim 1 wherein the charge pumping circuit is inactivated a period of time after the charge pumping circuit stops pumping.

4. The low-power charge pump regulator of claim 1 wherein the charge pumping circuit pumps charge when the output circuit provides an output voltage below a threshold voltage.

5. The low-power charge pump regulator of claim 1 further comprising a reference voltage circuit operative to provide a reference voltage.

6. The low-power charge pump regulator of claim 5 wherein the reference voltage circuit is further operative to be activated and inactivated in response to the control circuit.

7. The low-power charge pump regulator of claim 6 wherein the reference voltage circuit is activated before the charge pumping circuit is activated.

8. The low-power charge pump regulator of claim 1 wherein the control circuit comprises a counter operative to output a signal operative to activate and inactivate the charge pumping circuit.

9. The low-power charge pump regulator of claim 1 wherein the charge pumping circuit comprises the oscillator and the amplifier and the output circuit comprises the charge storage circuit and the transistor.

10. The low-power charge pump regulator of claim 1 wherein the charge storage circuit comprises:
a first capacitor;
a second capacitor; and
a resistor coupled between the first and second capacitors.

11. Low-power charge pump regulator, comprising:
clock means for providing a clock signal;
charge pump regulator means comprising a charge pumping means and output means; and control means operative to turn the charge pumping means on and off in response to the clock signal; and wherein the charge pump regulator means comprises:

oscillating means operative to provide an oscillating signal;

AND gate means operative to receive a first input signal comprising the oscillating signal and a second input signal;

diode means operative to receive an output from the AND gate means;

charge storage means operative to receive an output from the diode means and to store charge received from the diode means output;

transistor means comprising a control input coupled to the charge storage circuit, a first terminal coupled to a supply voltage, and a second terminal operative to supply an output voltage;

a first and a second resistance means connected in series coupled to the second terminal of the transistor; and amplifier means having a first input operative to receive a reference voltage signal, a second input coupled between the first and the second resistance means, and an output coupled to the second input of the AND gate means.

12. The low-power charge pump regulator of claim 11 wherein the charge pumping circuit is activated a period of time before the charge pumping means begins pumping.

13. The low-power charge pump regulator of claim 11 wherein the charge pumping means is inactivated a period of time after the charge pumping circuit stops pumping.

14. The low-power charge pump regulator of claim 11 wherein the charge pumping means pumps charge when the output means provides an output voltage below a threshold voltage.

15. The low-power charge pump regulator of claim 11 further comprising reference voltage means operative to provide a reference voltage.

16. The low-power charge pump regulator of claim 15 wherein the reference voltage means is further operative to activate and inactivate in response to the control means.

17. The low-power charge pump regulator of claim 16 wherein the reference voltage means is activated before the charge pumping means is activated.

18. The low-power charge pump regulator of claim 11 wherein the control means comprises counter means operative to output means operative to activate and deactivate the charge pumping means.

19. The low-power charge pump regulator of claim 11 wherein the charge pumping means comprises the oscillating means and the amplifier means and the output means comprises the charge storage means and the transistor means.

20. The low-power charge pump regulator of claim 11 wherein the charge storage means comprises:

first capacitance means;

second capacitance means; and resistance means coupled between the first and second capacitance means.

* * * * *